June 29, 1937.   W. H. SPIRE   2,085,049
MACHINE FOR MAKING FLASH BUTT WELDS
Filed Jan. 17, 1936
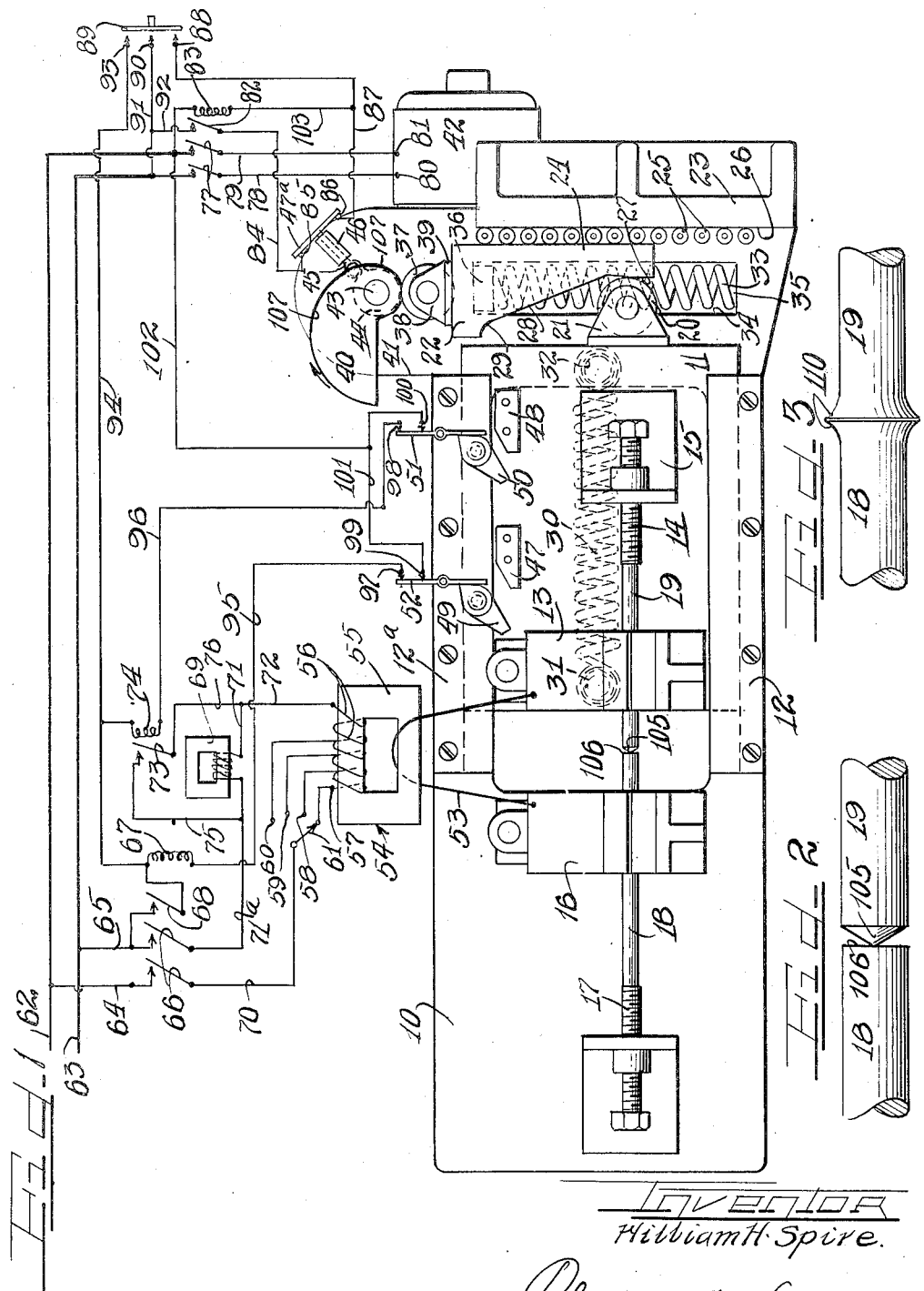
Inventor
William H. Spire.
By Charles M. Neill
Attys Patented June 29, 1937

2,085,049

UNITED STATES PATENT OFFICE 2,085,049

MACHINE FOR MAKING FLASH BUTT WELDS

William H. Spire, Cleveland, Ohio, assignor to Thompson Products, Incorporated, Cleveland, Ohio, a corporation of Ohio Application January 17, 1936, Serial No. 59,497

5 Claims. (Cl. 219—4)

This invention relates to a machine for and to a method of making flash butt welds.

It has heretofore been proposed to weld pieces together by passing a low voltage electric current through the pieces, while in tight contact, to cause the metal to be heated to a welding temperature due to the resistance of the metal itself to the flow of current, the heat generated being proportional to $I^2R$. In this method all of the metal between the clamping electrodes is heated to a welding temperature, the result being that more power is required and a larger upset of the work pieces is formed, which is costly to remove. Furthermore, this method does not lend itself well to the joining of alloy steels having high resistance to corrosion and heat. In fact, entirely satisfactory welds by this method can be made only in the case of comparatively low carbon steels and low carbon steels having not to exceed 5% nickel, or not to exceed 1½% nickel and 0.75% chromium. This is due to the fact that the metal at and adjacent to the line of junction is held at high temperatures for such a length of time as to cause a change in the steel structure, which is usually of the nature of an enlarged grain size with its resultant weakness.

Another method of welding involves maintaining the work pieces in slightly separated relation to cause arcing therebetween, whereby the work pieces are heated for only a short distance back from their ends, and the ends then brought together after they have been raised to a welding temperature. This second method requires only a fraction of the power needed by the first method and can be used to get satisfactory welds in most steels except those which are highly heat, scale and corrosion resistant.

My present invention relates more particularly to the welding together of such steel alloys as are heat and corrosion resistant and have the property generally referred to as "red-hardness". The method of my invention in general is similar to the second method above described but constitutes an improvement thereover in that it enables heat and corrosion resistant metals to be satisfactorily welded together.

According to the method of my invention, the metal work pieces, which are originally in light contact with each other at their ends, are separated slightly as the current is turned on to cause arcing between the ends of the work pieces and a burning away of the metal at the ends. As the metal of the ends is burned away, the work pieces are moved relatively toward each other and the arcs maintained until the temperature of the work piece ends has been brought to a satisfactory welding temperature. Thereupon, the voltage of the current through the work pieces is considerably reduced, so that the ends only of the work pieces will be maintained at a good welding heat but such heat will not extend backward from the ends more than a very slight distance. At the time the voltage is reduced, the work pieces are moved suddenly and with considerable force to bring their ends together and sufficient pressure is applied to cause a lateral displacement or flow of the metal at the junction, so as to effect a good weld.

My method thus fulfills the three conditions that are necessary to a satisfactory weld. These conditions are, first, temperature; secondly, pressure; and thirdly, deformation. Time, too, is an element because if the time consumed is too great, heat will be radiated as fast as generated and no weld, or a very poor weld will result. Each of these conditions, to some degree, effects or modifies the other. For instance, if the temperature is too high, the pressure required to cause the necessary deformation is too low, resulting in a poor weld, because the internal physical resistance opposed to the applied pressure is not great enough to knit the metal firmly together. If the temperature is too low, the pressure required to make the necessary deformation cannot always be obtained in the case of a given machine, and hence the deformation is not sufficient to make intimate union of the metal on the two sides of the junction and a poor weld results. In other words, the metal has not moved enough to knit well.

With a given temperature, if the pressure is too low, the deformation may not be sufficient for an intimate union. If the pressure is too high, deformation is too great, making an upset of the junction that is costly to remove, or all the plastic metal is thrown out of the junction and metal too cold to knit together is brought into contact, resulting in what is called a "cold weld", which is brittle.

The method of my invention properly correlates the various factors and conditions necessary to give a satisfactory weld, and avoids the poor results that are brought about when the factors and conditions are not properly balanced. I attribute the successful operation of my method of welding largely to the fact that the heating circuit is kept closed during the application of pressure at the end of the heating period, but at a much reduced voltage, so that the metal does not become overheated. The voltage during this period, nevertheless, is sufficient that the resultant current heats the metal, due to its resistance, for a short distance on each side of the junction and thus softens the metal sufficiently to permit ready deformation. The low spots, or valleys, in the end surfaces of the work pieces are, accordingly, filled up by the high spots, or hills, being levelled down and the transverse movement of the metal knits the two work pieces firmly together. The very slight upsetting of the metal at the junction eliminates any voids that might otherwise be formed.

The means that I have devised for obtaining this desired result includes the use of a choke coil connected in series with the primary of the welding transformer, between it and the main magnetic contactor. Suitable means are provided for throwing the choke coil into the primary of the transformer when the metal of the work pieces has reached a welding temperature and the upsetting operation is about to take place, whereupon, with the choke coil in circuit, the voltage in the work circuit is reduced to the desired extent, as above explained.

It is therefore an important object of this invention to provide a machine for and a method of making flash butt welds, whereby corrosion and heat resistant metals may be welded together to effect satisfactory welds and with a minimum power consumption and with very little upsetting of the metal itself.

It is a further important object of this invention to provide a machine that is entirely automatic, so that when arranged for the welding of particular steels or alloys, satisfactory welds will always be obtained automatically and without dependence upon the skill of the particular operator.

It is a further important object of this invention to provide a method of making flash butt welds wherein the ends of the work pieces to be welded together are raised to a welding temperature by the heat of the arc generated therebetween and the heating is largely localized at the ends of the work pieces so that very little upsetting takes place.

It is a further important object of this invention to provide a method of making flash butt welds wherein the steps of the method are carried out entirely automatically in accordance with a predetermined pattern in accordance with the particular type, size and characteristics of the work pieces which are to be welded together.

It is a further important object of this invention to provide a method of making flash butt welds whereby satisfactory welds can be made with practical certainty between work pieces of highly heat and corrosion resistant steel alloys.

Other and further important objects of this invention will be apparent from the disclosures in the specification and the accompanying drawing.

This invention (in a preferred form) is illustrated in the drawing and hereinafter more fully described.

On the drawing:

Figure 1 is a combined top plan view of a machine and a wiring diagram therefor, illustrating a preferred embodiment of my invention.

Figure 2 is a fragmentary elevational view of the end portions of two work pieces prior to being welded together; and Figure 3 is a fragmentary view of a flash butt welded joint, as made between the work pieces of Fig. 2.

As shown on the drawing:

The reference numeral 10 indicates generally the bed of a machine for making flash butt welds in accordance with the principles of my invention. A member 11 is slidably mounted on said bed 10 between guideways 12 and 12a. Said slide 11 carries a copper clamping member 13 and a cooperating, adjustable stop 14, the latter being a bolt threaded through the upstanding portion of a bracket 15 and being in alignment with the opening between the clamping jaws of the electrode member 13.

A similar clamping electrode 16 and cooperating stop member 17 are mounted upon the stationary bed 10 in proper alignment. Work pieces 18 and 19 are adapted to be held in said clamping electrodes 16 and 13, respectively, against the corresponding stop members 17 and 14, respectively. As is obvious, the stops 14 and 17 prevent the work pieces from sliding through the clamping electrodes 13 and 16 and cooperate with said electrodes in applying the necessary pressure to bring the ends of the work pieces together and upset them, as will be subsequently explained.

A roller 20 is carried by a suitable bracket 21 secured to the other end of the slide 11 for cooperation with a cam member 22 to impart the desired series of movements to the slide 11. Said cam member 22 is disposed horizontally between the end of the slide 11 and a backing plate 23, a plane face 24 of said cam member bearing against a plurality of roller bearings 25 suitably arranged between said plane face 24 and a similar plane face 26 of the backing member 23.

Said cam member 22 is provided with a series of cam surfaces comprising a plane surface 27 which is slightly rearwardly inclined from one end of the cam member; an intermediate forwardly inclined plane surface 28; and a sharply, forwardly inclined arcuate surface 29 near the other end of said cam member. In using the terms "rearwardly" and "forwardly", the right hand end of the machine, as viewed in the drawing, is considered the rear end, and the left hand end is considered the forward end.

A spring 30, secured at its forward end to a pin 31 projecting from the underside of the slide 11 and secured at its rear end to a pin 32 in the stationary bed 10, serves to hold the roller 20 against the cam surfaces 27, 28, and 29 during movement of the cam member 22, and also serves to retract said slide 11 to its rearward position when free to do so. The cam member 22 is also provided with an associated spring, designated by the reference numeral 33. Said spring 33 is mounted under compression in an opening 34 of said bed 10, so as to bear at one end against a wall 35 of the bed and the other end against a lug 36 dependent from said cam member 22.

Said cam member 22 carries at its larger end a roller 37 mounted for rotation between the ears 38 of a bracket 39 secured to said cam end. A cam 40 cooperates with said roller 37 to impart the desired series of movements to the cam member 22. Said cam 40 is suitably mounted upon an extension 41 of said stationary bed 10 and is driven through a reducing mechanism (not shown) housed within said extension 41, from a motor 42. The same shaft 43 that carries the cam member 40 also carries a second cam 44, which cooperates with a rod 45, slidably mounted in a sleeve 46 to actuate a contact member 47a.

A pair of spaced blocks 47 and 48 are carried by said slidable member 11 for cooperation with a pair of pivotally mounted cam levers 49 and 50, respectively, which are mounted on the guideway 12a. The spacing of said blocks 47 and 48 and their corresponding cam levers 49 and 50 is such that the block 48 engages and actuates the cam lever 50, during forward movement of the slide 11, slightly before the block 47 engages and actuates the cam lever 49. Said cam lever 50, when actuated by the block 48, bears against one arm of a pivotally mounted switch 51 to open the same. In a similar manner, the cam 49 is actuated by the block 47 to open a switch 52.

The wiring diagram will now be explained.

The copper clamping electrodes 13 and 16 are electrically connected to a secondary 53 of a transformer 54 having an iron core 55 and a primary winding 56. The primary winding 56 is provided with a plurality of taps 57, 58, 59, and 60 for varying the number of primary turns by means of a switch 61, whereby the voltage of the secondary 53 may also be varied and hence the voltage across the junction between the work pieces 18 and 19. It will be understood, of course, that the clamping electrodes 16 and 13, as well as their corresponding stops 17 and 14, are insulated from the stationary bed 10 and from the side 11.

The main power line is represented by the wires 62 and 63. A wire 64 is connected from the power wire 62 and a wire 65 is connected from the power wire 63 to a magnetic contactor 66 which controls the current to the transformer 54. Said magnetic contactor has an operating coil 67 and a holding contact 68 associated therewith.

A reactive, or choke coil 69 is connected in series with the primary winding 56 of the transformer 54. To accomplish this, a wire 70 leads directly from one pole of the magnetic contactor 66 to the switch 61, and another wire 71 connects one end of the choke coil 69 to a wire 72 connected to the other end of the primary winding 56. Wire 71a interconnects the other end of the choke coil to the other pole of the magnetic contactor 66.

A single pole magnetic switch 73 having an operating coil 74 is connected in parallel with the choke coil 69 by means of wires 75 and 76. Consequently, when this single pole magnetic switch 73 is closed, full line voltage is supplied to the primary coil 56 of the transformer 54 and when said switch 73 is opened, the voltage applied to the primary 56 is limited by the choke coil 69 in an amount depending upon the impedance of the choke coil. In practice, the choke coil 69 may have a plurality of taps (not shown), so that the voltage drop can be adjusted for best results.

The power lines 62 and 63 are connected through a switch 77 and connecting wires 78 and 79 to the terminals 80 and 81, respectively, of the motor 42. Said switch 77 is a magnetic contactor with a holding contact 82 and an operating coil 83. Said holding contact 82 is connected in series with the switch 47a by means of a wire 84 leading to a terminal 85 of said switch. The other terminal 86 of said switch 47a is connected by a wire 87 to a terminal 88 controlled by a push button 89. A second terminal 90 is connected directly to the power line 63 by a wire 91 and by a branch wire 92 to one side of the holding contact 82. A third terminal 93, controlled by said push button 89, is connected by a wire 94 to the coils 67 and 74, which are arranged in parallel and are connected respectively by wires 95 and 96 to contacts 97 and 98 of the switches 52 and 51. The other contacts 99 and 100 of said switches 52 and 51, respectively, are connected together by means of a wire 101 and by a wire 102 to power line 62 and thence to one side of the operating coil 83. The other side of said operating coil 83 is connected by a wire 103 to the wire 87.

The operation is substantially as follows. The work pieces 18 and 19 are clamped in the copper electrode clamps 16 and 13, respectively, with their ends abutting the stops 17 and 14, respectively. Preferably one of the work pieces, such as the piece 19, is provided with a generally conical end 105. This is done to cut down the initial inrush of current before arcing has started and thus prevent overheating and blowing out of excess metals. The other work piece 18 is provided with a rough sheared end 106, it having been found that rough sheared ends are better than squared ends.

The push button 89 is next momentarily depressed to close the control circuit. With the control circuit closed, the contactor coils 74, 67, and 83 are energized, to pull in their associated contactors 73, 66, and 77 and the holding contacts 68 and 82. Immediately upon the closing of the contacts 68 and 82, current flows to energize the coils 74, 67, and 83, independently of the push button 89, and to maintain the contactors 73, 66 and 77 in their closed position until the control circuit is opened at some other point. The push button 89 may therefore be released immediately upon the closing of the holding contacts 68 and 82.

The closing of the contactors 66 and 73 supplies full line voltage and current to the welder transformer 54 and low voltage to the pieces 18 and 19 through the copper clamps 16 and 13. At the same time, the motor 42 is supplied with energy through the contactor 77, whereupon the motor, acting through the reducing mechanism, turns the cam 40 in the direction indicated by the arrow on the drawing.

Upon the first movement of the cam 40, due to the gradually increasing rate of curvature of its cam surface 107, the action of said cam 40 is to move the cam member 22 against the action of the spring 33. Initially, the roller 20 follows the slightly rearwardly inclined plane cam surface 27, so that due to the action of the spring 30, the slide 11 is moved slightly rearwardly to separate the ends 106 and 105 of the work pieces 18 and 19, respectively.

This slight separation of the ends of the work pieces causes an arc to be set up between said ends. The maximum length of the arc is reached when the roller 20 comes to the end of the rearwardly inclined cam surface 27 and starts up the forwardly inclined cam surface 28. During the movement of the roller 20 over the cam surface 28, the slide 11 is advanced so as to bring the clamping electrodes 16 and 13 relatively closer together. During such movement, however, the continued arcing between the ends of the work pieces 18 and 19 causes the metal of said ends to be burned away and thus maintains the arc.

When the steeply forwardly inclined cam surface 29 reaches the roller 20, the block 48 comes into contact with the cam lever 50. A slightly further movement of the cam member 22 causes the block 48 to tip the cam lever 50 and open the switch 51. Thereupon the coil 74 is deenergized and its controlled contactor 73 is opened to pass the current through the choke coil 69. This reduces the voltage to the primary of the welder transformer 54 and hence reduces the voltage across the work pieces 18 and 19 to a point where the arcs are nearly extinguished.

The remaining arcs do not burn away the metal fast enough to maintain a space between the ends of said work pieces 18 and 19, with the result that said ends come into actual contact. During the further travel of the roller 20 up the steeply inclined cam surface 29, the voltage across the junction of the pieces 18 and 19 is only sufficient to heat them strictly by the resistance of the metal itself in accordance with the formula, $I^2R$, to an upsetting temperature. While at the upsetting temperature, the continued movement of the slide 11 and work piece 19 carried thereby causes an actual upsetting of the metal at the junction between the work pieces. The metal that is moved outwardly to make this upset exerts a rubbing movement transversely of the axes of the work pieces over other metals to cause a firm knitting together of the metal at the junction.

When the roller 20 reaches the top of the inclined cam surface 29, block 47 contacts the cam lever 49 to open the switch 52 and deenergize the coil 67 of the contactor 66, thereby allowing the contactor to drop out and cut off the current to the welder transformer 54. This happens just as the high point of the cam surface 29 passes the center line of the roller 20. The motor 42 continues to turn the cam 44 until the high point 107 strikes the end of the slidable rod 45 to open the switch 47a which deenergizes coil 83, whereupon contactor 77 opens to stop the motor.

As the motor is being stopped, the high point of the cam 40 passes the center line of the roller 37 and permits the spring 33 to return the cam member 22 to its initial position. The spring 30 at the same time returns the slide 11 to its starting position toward the rear of the machine. The sequence of operations is then repeated.

The amount of the upset, as indicated by the reference numeral 110 (Fig. 3) is relatively small, being only about $\frac{1}{32}$ to $\frac{1}{16}$ of an inch in practice. While the amount of upsetting will, of course, depend somewhat upon the size and the characteristics of the work pieces, with work pieces of a given size and having a given analysis, the same amount of upsetting will result every time for the same setting of the machine. With work pieces of different size and analyses, the proper setting of the machine can be determined experimentally and the correct arrangement of cam surfaces and selection of current voltages be made accordingly.

It is thus possible for a given welding job to so set the machine as to carry out the operation entirely automatically and practically always secure a satisfactory weld. It is my theory that the satisfactory character of the weld secured by the use of my machine is largely due to the fact that the heating of the work pieces is largely localized at their ends and that during the upsetting operation, the voltage of the current is reduced to a point at which only sufficient heat is generated by the resistance of the metal itself to keep the metal in a sufficiently plastic state to effect a good knitting together of the metal of the two work pieces. In the embodiment of my machine illustrated, this is made possible by the use of a choke coil, but the same result could be obtained, for instance, by the use of suitable resistance, or by automatically changing taps on the primary of the welder transformer. I have found, however, that a choke coil lends itself more readily to ease in control and is more efficient.

While my machine may be used in making flash butt welds on steels or steel alloys of various analyses, it shows its greatest superiority over formerly used welding machines if used to weld alloy steels having high heat and corrosion resistant properties, since such alloy steels could not previously be satisfactorily welded. My machine can also be used satisfactorily in cases where a piece of one analysis cannot be satisfactorily welded to a piece of another analysis, yet either could be welded by former methods to straight carbon or low alloy nickel or chrome nickel steel.

The following are two typical analyses of alloys used which do not weld readily either to other pieces of the same analysis or to each other, but both of which can be welded satisfactorily by former methods to SAE analysis 1020 or 3140:

| Analysis | A | B |
| --- | --- | --- |
| Carbon (C) | 0.40–.50 | 1.22–1.43 |
| Chromium (Cr) | 13–15 | 11.75–13.75 |
| Nickel (Ni) | 13–15 | 0.60 |
| Cobalt (Co) | | 2.7–3.3 |
| Manganese (Mn) | 0.70 max. | 0.35 max. |
| Molybdenum (Mo) | 0.50 max. | 0.55–.85 |
| Phosphorus (P) | 0.03 max. | 0.03 max. |
| Sulphur (S) | 0.025 max. | 0.03 max. |
| Silicon (Si) | 0.30–0.80 | 0.60 max. |
| Tungsten (W) | 1.75–3.00 | |
| Iron (Fe) | Balance | Balance |

Using my machine, alloy steels of the above analyses A and B can be satisfactorily welded to other steels of like analysis, or to each other. After the conditions for carrying out the welding operation have once been established, they are subsequently maintained by my automatic machine itself. While they may be welded in a manually controlled machine, such welds are variable because dependent too much upon the man operating the machine.

It will be understood that sheets or plates of metal, as well as rods or bars, may be flash butt welded in accordance with the above described method and that my invention is not limited to any particular shape of article to be welded or to any particular analysis of metal.

I am aware that many changes may be made and numerous details of construction may be varied through a wide range without departing from the principles of this invention, and I, therefore, do not propose limiting the patent granted hereon otherwise than necessitated by the prior art.

I claim as my invention:

1. A machine for making flash butt welds, which comprises relatively movable means for clampingly holding a pair of metal pieces in alignment, means for supplying electrical current through said clamping means to said metal pieces, a prime mover, cam means actuated by said prime mover and operating through said clamping means first to separate the ends of said metal pieces slightly, then to move said pieces gradually toward each other and finally to press said pieces forcibly together to upset and weld said ends together and means synchronized with the action of said cam means to reduce the voltage of the current passing through said ends just prior to the upsetting step.

2. In a machine for making flash butt welds, relatively movable clamping means for holding a pair of metal work pieces in alignment and for conducting electrical current thereto, means for moving said clamping means relative to each other through a predetermined series of movements, a source of electrical current, a circuit including said clamping means and means in said circuit actuated at a predetermined point in the movement of said clamping means to cut down the voltage of the current passing through said clamping means and work pieces.

3. In a machine for making flash butt welds, relatively movable clamping means for holding a pair of metal work pieces in alignment and for conducting electrical current thereto, means for moving said clamping means relative to each other through a predetermined series of movements, a source of electrical current, a circuit including said clamping means, a choke coil having connections for placing the same in parallel or in series in said clamping means circuit, and cam operated contact members in said circuit actuated at a predetermined point in the movement of said clamping means to throw said choke coil in series in said circuit to cut down the voltage of the current passing through said clamping means and work pieces.

4. In a machine for making flash butt welds including relatively movable electrodes for clampingly holding metal work pieces in alignment, an electrical circuit, a transformer the secondary side of which is connected to said electrodes, a choke coil on the primary side of said transformer, a portion of said primary side circuit being in parallel with said choke coil and containing a coil controlled magnetic switch, and cam actuated switch means for throwing said choke coil into said primary side at a predetermined point in the travel of said electrodes.

5. Welding apparatus comprising a pair of relatively movable electrodes arranged to hold metal work pieces to be welded together, means for relatively moving said electrodes towards each other during the welding operation, a transformer having a primary and secondary, the secondary being connected to the electrodes, a source of electric current connected to initially supply the primary of the transformer with line voltage, and means controlled by the movement of said electrodes for subsequently reducing the supplied voltage at a predetermined point of the welding operation.

WILLIAM H. SPIRE.